(12) United States Patent
Wang (10) Patent No.: US 9,125,074 B2
(45) Date of Patent: Sep. 1, 2015

(54) COORDINATED MULTI-POINT TRANSMISSION AND MULTI-USER MIMO

(71) Applicant: Xiao-an Wang, Allentown, PA (US)

(72) Inventor: Xiao-an Wang, Allentown, PA (US)

(*) Notice: Subject to any disclaimer, the term of this patent is extended or adjusted under 35 U.S.C. 154(b) by 228 days.

(21) Appl. No.: 13/854,130

(22) Filed: Mar. 31, 2013

(65) Prior Publication Data

US 2014/0293803 A1    Oct. 2, 2014

(51) Int. Cl.
H04W 24/02     (2009.01)
H04B 7/04      (2006.01)
H04W 16/28     (2009.01)
H04B 7/02      (2006.01)

(52) U.S. Cl.
CPC .............. *H04W 24/02* (2013.01); *H04B 7/024* (2013.01); *H04B 7/0452* (2013.01); *H04W 16/28* (2013.01)

(58) Field of Classification Search
None
See application file for complete search history.

(56) References Cited

U.S. PATENT DOCUMENTS

| 2003/0083089 | A1* | 5/2003 | Malladi | 455/522 |
| 2006/0291409 | A1* | 12/2006 | Battista et al. | 370/320 |
| 2010/0087151 | A1* | 4/2010 | Auer | 455/67.11 |
| 2010/0127931 | A1* | 5/2010 | Rensburg et al. | 342/372 |
| 2013/0064129 | A1* | 3/2013 | Koivisto et al. | 370/252 |

OTHER PUBLICATIONS

Stephan Saur, et. al, "Grid-of-Beams (GoB) Based Downlink Multi-User MIMO", May 5, 2008. Source: C80216m08_487.doc @ http://www.ieee802.org/16/tgm/contrib/.

* cited by examiner

*Primary Examiner* — Anh-Vu Ly
*Assistant Examiner* — Roberta A Shand (57) ABSTRACT

MU-MIMO and CoMP have potentials to increase the cell capacity by many folds. Interferences and channel feedback overhead, however, severely limits such potentials. Method of reference signal-based grid of beams (RS-GOB) is described. RS-GOB distributes the effective antennas of a base station into multiple beams, thereby significantly reducing the feedback overhead of CoMP and making effective use of CoMP to turn the interferences into cooperating useful signals. RS-GOB also reduces the need for small HetNet cells, which mitigates the interferences of small HetNet cells on macro cells.

14 Claims, 6 Drawing Sheets

COORDINATED MULTI-POINT TRANSMISSION AND MULTI-USER MIMO

BACKGROUND

1. Field of Application

The following description relates generally to telecommunications systems and wireless communications systems.

2. Prior Art

Cell capacity is a key performance measure in wireless cellular networks. Next generation of cellular standard, long-term evolution, advanced (LTE-A), has adopted many capacity-enhancing technologies, including coordinated multi-point transmission/reception (CoMP), multi-user multi-input multi-output (MU-MIMO), and heterogeneous networks (HetNet). Together these technologies have the potential to improve the cell capacity by many folds.

Successful implementation of the capacity-enhancing technologies in cellular networks, however, faces tremendous challenges. There are strong interferences between standard macro cells and the small HetNet cells. Interferences can also be severe between beams in MU-MIMO. Existing means to overcome or mitigate these challenges may significantly offset the benefits of the capacity-enhancing technologies. For example, one way to reduce the interference is to schedule the interfering transmission antennas or base stations to transmit on different resources in the manners of time multiplexing and frequency multiplexing, etc. However, resource multiplexing reduces the cell capacity considerably. CoMP is another way to reduce the interferences, but the channel feedback overhead of CoMP may overwhelm the uplink due to more and more transmitting antennas deployed in a macro cell for MU-MIMO.

Small HetNet cells also need backhaul connections to communicate with the macro cell and the network, which increases the deployment cost. The distributive nature of small HetNet cells also makes the centralized control of the cellular networks more difficult.

Thus methods, apparatus, and systems are needed that overcome the implementation challenges and that fully realize the benefits of the capacity-enhancing technologies.

SUMMARY

The following is a summary of one or more aspects in order to provide a basic understanding of such aspects. Some concepts of one or more aspects are presented in a simplified form as a prelude to the more detailed descriptions that are to be presented later.

In some aspects of the subject disclosure, a scheme called reference-signal grid of beam (RS-GOB) is used to distribute the effective antennas of a base station among multiple beams, which significantly reduces the number of downlink channels that have to be fed back, thereby significantly reducing the channel feedback overhead.

In some further aspects of the subject disclosure, a mobile user can use reduced channel feedback to further reduce the feedback overhead.

In some other aspects of the subject disclosure, a gridless MIMO link can be established between a base station and a multi-antenna mobile user, which enables the maximum throughput afforded by the multiple antennas of the mobile user.

In still other aspects of the subject disclosure, RS-GOB is used to reduce the need for small HetNet cells, thereby reducing the potential sources of interference.

Accordingly several advantages are to provide a flexible spatial structure on MU-MIMO beams that reduces channel feedback overhead in CoMP and yet allows high-throughput mobile users to achieve their maximum throughput. Still further advantages and novel features will become apparent from the study of the following description and the accompanying drawings.

DETAILED DESCRIPTION

The disclosed subject matter will now be described more fully hereinafter with reference to the accompanying drawings, in which some, but not all aspects or embodiments, are shown with like numerals referring to like elements throughout the description. Various aspects may be embodied in many different forms and should not be construed as limited to the embodiments set forth herein. Specific details are described for the purpose of providing a thorough understanding of the subject innovation. It may be evident, however, that the disclosed subject matter may be practiced without these specific details. In other instances, well-known methods, procedures, and components have not been described in detail so as not to obscure the subject innovation.

As used herein, term "antenna" at a base station is intended to refer to the "effective" antenna perceived by the mobile users. Thus an antenna in a base station does not necessarily correspond to a physical antenna. Instead, a base station antenna herein may be a weighted combination of multiple physical antennas. Accordingly, the number of effective antennas at a base station may not necessarily be the same as the number of physical antennas at a base station. For example, a base station may have an array of 128 physical antennas, but the number of effective antennas can be 1, 2, 4, 8, or other values. Hereinafter term "the number of antennas" at a base station refers to the number of effective antennas at that base station.

Figure 1:
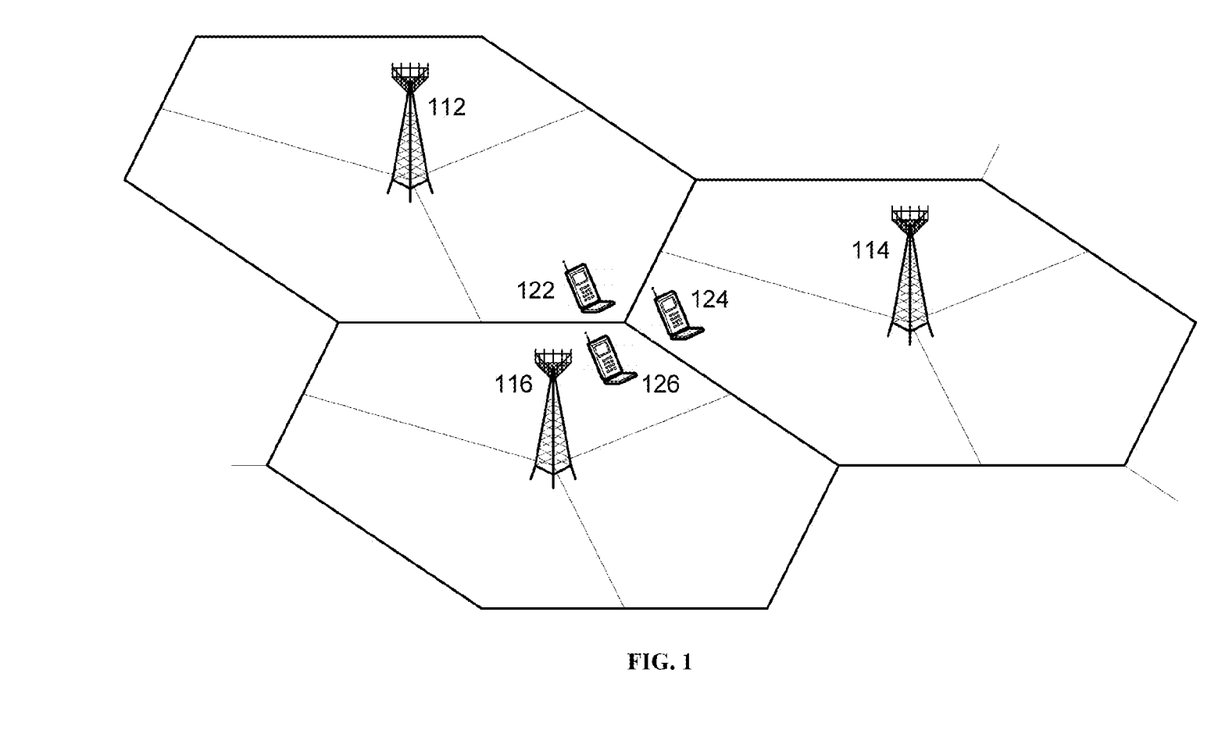
FIG. 1 illustrates an example CoMP set in a wireless cellular network.

FIG. 1 illustrates an example CoMP set in a wireless cellular network. The CoMP set consists of base stations 112, 114, and 116, and mobile users 122, 124, and 126. Each base station covers a macro cell with one or more cell sectors. In FIG. 1, there are 3 cell sectors in each macro cell. In non-CoMP mode, the serving base stations for mobile users 122, 124, and 126 are base stations 112, 114, and 116, respectively. That is, mobile user 122 is connected to base station 112, mobile user 124 to base station 114, and mobile user 126 to base station 116. Since mobile users 122, 124, and 126 are at or close to the cell edges, the desired signal for any mobile user from the corresponding base station is subjected to strong interference from neighboring base stations. For example, the signal from base station 112 to mobile user 122 can be strongly interfered by the signal from base station 114 to mobile user 124 and the signal from base station 116 to mobile user 126.

In CoMP mode, base stations 112, 114, and 116 transmit the combinations of the signals intended for mobile users 122, 124, and 126. For each base station, the combination "weight" for each mobile user signal can be different. Through elaborate algorithms, the signals are combined at each base station in such a way that when the transmitted signals from base stations 112, 114, and 116 arrive at mobile user 122, the signals for mobile users 124 and 126 are cancelled out or minimized, while the signal for mobile user 122 is maximized or enhanced, thus the signal quality of mobile user 122 improves significantly. Similarly, mobile users 124 and 126 will also see significant improvement in the quality of their respective signals. The combining of the signals at each base station is commonly referred to as "precoding". The combining weights for each mobile-user signal and for each base station constitute the elements in a so called "pre-coding matrix".

Precoding requires that the base stations have exact downlink channel information, which has to be fed back by the mobile users via the uplink. For each downlink channel between a base station antenna and a mobile user antenna, efficient channel feedback schemes, such as time-domain parameters (TDP) extraction, are available that have extremely low channel feedback overhead. As more and more antennas are deployed in each cell, however, the number of downlink channels that need to be fed back grows quickly. Accordingly, the channel feedback overhead becomes too high when there are too many downlink channels, even if the feedback overhead is low for each individual downlink channel.

For example, if in FIG. 1 each base station has 8 antennas and each mobile user has two antennas, each mobile user then has to feed back 8×2×3=48 downlink channels, and the aggregated feedback overhead by all three mobile users will be 48×3=144 downlink channels. Clearly, the sheer number of the downlink channels to be fed back can make the feedback overhead prohibitive. In addition, the precoding matrix has a dimension of 24×6, making its computation complex and expensive.

Moreover, in a CoMP set with three eight-antenna base stations, the full CoMP capacity (i.e., the total data throughput from base station antennas to mobile user antennas) can only be achieved when the CoMP set supports mobile users with 24 antennas combined (so that the total number of transmit antennas equals to the total number of receive antennas). This increases the aggregated feedback overhead to 576 downlink channels and the dimension of the precoding matrix to 24×24, which makes the problems of the feedback overhead and computational complexity even more challenging. Further, it can be very difficult to find mobile users with a total of 24 antennas, so the CoMP capacity is most likely under-utilized.

Figure 2:
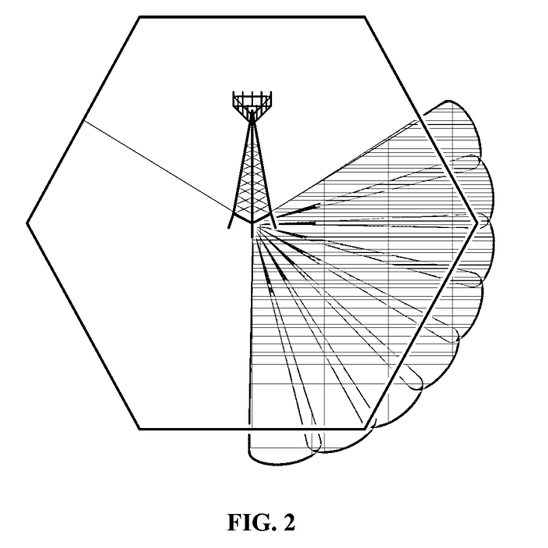
FIG. 2 illustrates an example GOB scheme.

Grid of beams (GOB) imposes a spatial structure on MU-MIMO. FIG. 2 illustrates an example GOB scheme. In FIG. 2, a base station deploys 8 signal beams using an antenna array. The eight signal beams are positioned on a spatially predetermined pattern or a grid, hence the name of GOB, and together they cover an entire cell sector. The antennas of the base station are grouped into each beam such that each signal beam contains one or more antennas. For example, if the base station in FIG. 2 has 8 physical antennas, each beam can have one antenna that is beamformed by the 8 physical antennas. Other beam/antenna combinations also possible. For example, the cell sector can be divided into 4 two-antenna beams.

If two mobile users are in the centers of two different beams, then the signals for the two mobile users can be transmitted using the same resources in time domain and/or frequency domain, thereby doubling the cell throughput or the cell capacity. The eight-beam GOB in FIG. 2 can theoretically increase the cell capacity by a factor of eight, the same improvement as in an eight-antenna MU-MIMO.

The inter-beam interference in a GOB, however, severely limits the benefits of GOB. If a mobile user is at the beam edge, the data throughput is actually much worse compared to the case of a single antenna covering the entire cell sector. Accordingly, the average cell throughput, i.e., the average cell capacity, can be only a small fraction of what GOB can achieve.

Another problem with GOB is that while its maximum cell capacity is the same as that of MU-MIMO, the maximum cell capacity is spread over the beams under GOB. Each beam then has a throughput that is only a fraction of the maximum cell throughput. For a mobile user that is equipped with a large number of antennas and thus is able to achieve a very high throughput, a beam in a GOB may not be able to deliver the throughput that the multi-antenna mobile user requests.

Figure 3:
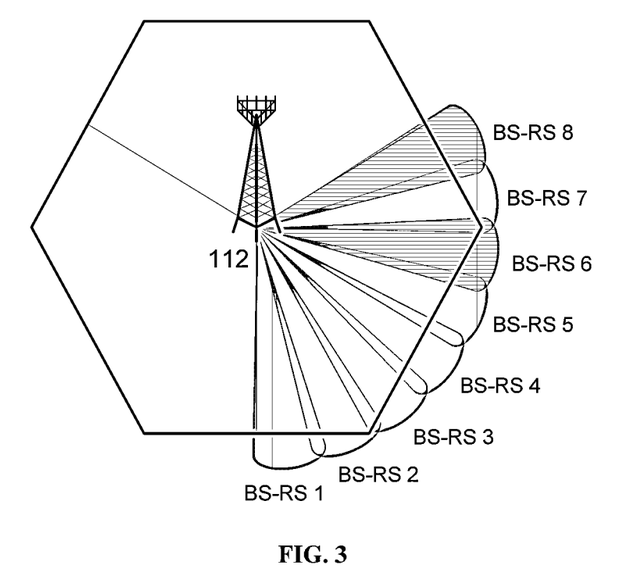
FIG. 3 illustrates an example scheme of RS-GOB.

FIG. 3 illustrates an example scheme of reference signal GOB (RS-GOB). A reference signal is part of the transmitted signal that is known to the receiver for channel estimation and data demodulation. In FIG. 3, base station 112 deploys 8 signal beams using an antenna array as in FIG. 2. Each signal beam has an RS that is assigned to it, and is referred to as beam-specific RS (BS-RS). In other words, a beam in a cell sector can be identified with its BS-RS. The part of the transmitted signal that is not BS-RS is referred to as "data signal (DS)", which includes user data, control data, and in some cases, user-specific reference signal. In an RS-GOB, the DS may or may not be transmitted according to the same beam pattern as the BS-RS.

It should be understood that if a signal beam consists of more than one antenna, the BS-RS of the signal beam refers to the collection of the RSs for all antennas in the signal beam.

Figure 4:
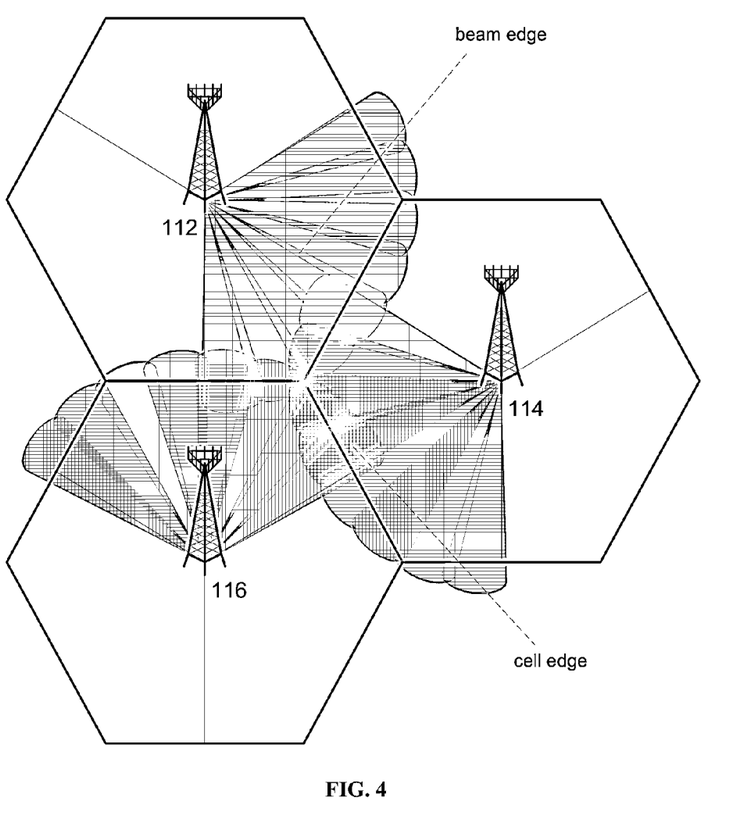
FIG. 4 illustrates an example CoMP scheme on the RS-GOB in a wireless network.

FIG. 4 illustrates an example CoMP scheme on the RS-GOB in a wireless network. A mobile user measures the beam power by measuring the power of the BS-RS. If the received signal power is dominated by only one beam, the mobile user is considered to be in the center of that beam, referred to as "home beam", which can be used as the communication link between the mobile user and the network. In a home beam, the DS is transmitted in the same beam pattern as the BS-RS.

If there is more than one dominant beam, the mobile user is likely at the beam edge or the cell edge, and can be considered as a candidate for a member of a CoMP set. Herein term "dominant beams" refers to those beams whose combined power exceeds a large percentage, say, 80% or 90%, of the total received signal power. The mobile user may send the "beam profile information" to the network as a part of process of initializing a CoMP session. The beam profile information may contain, but is not limited to, the following information: the number, the identification, and the power of dominant beams. The network then determines the CoMP set and establishes the CoMP link between the base stations and the mobile users in the CoMP set. The CoMP set depends on the beam profile information and/or the downlink channels fed back from the candidate mobile users. In the context of CoMP, a beam is considered as a base station, therefore a CoMP set consists of a number of beams, which come from one or more base stations, and a number of mobile users.

The reduction of the feedback overhead by RS-GOB can be illustrated in the following examples. Assume that the beams in FIG. 4 are single-antenna beams. Consider a two-antenna mobile user at the beam edge between two beams. The mobile user and two strongest beams perceived by the mobile user form a CoMP set. The mobile user needs to feed back only 4 downlink channels, and the aggregated feedback overhead is also 4 downlink channels since there is only one mobile user in the CoMP set.

At the cell edge in FIG. 4, a CoMP set may have 3 to 6 beams from three cell sectors. A two-antenna mobile user then needs to feed back 6 to 12 downlink channels. At full CoMP capacity, the aggregated feedback overhead ranges from 9 to 36 downlink channels, and the precoding matrix is at most 6×6.

It can be seen that CoMP with RS-GOB dramatically reduces the feedback overhead compared to CoMP without GOB. Maximum cell capacity is maintained despite of much smaller sizes of the CoMP sets, since multiple CoMP sessions can occur simultaneously at spatially separated locations at beam edges or cell edges. Moreover, the feedback overhead can be further reduced as described below.

If there are two dominant single-antenna beams at the location of a mobile user, such as at the beam edge, and the mobile user has two antennas, then the mobile user does not need CoMP, since it can use its two antennas to receive from the home beam while rejecting the interference from the other beam. Thus with two dominant single-antenna beams, only single-antenna users may need CoMP. Since more and more mobile devices have been equipped with two antennas, the feedback overhead, particularly at the beam edge, can be reduced considerably. In general, if the number of antennas in a mobile user equals to or exceeds the number of antennas in the dominant beams, CoMP is not necessary for the mobile user.

For a multi-antenna mobile user, it may choose to feed fewer number of downlink channels. For example, if there are 4 dominant single-antenna beams at location of a two-antenna mobile user, there are 8 downlink channels to be fed back by the mobile user:

$$h_{11}, h_{12}, h_{13}, h_{14}$$

$$h_{21}, h_{22}, h_{23}, h_{24} \quad (1)$$

Instead of feeding back all 8 channels, the mobile user may choose to feed back the following channels:

$$h_{11}, h_{12}, h_{13}, h_{14} \quad (2)$$

or the following channels:

$$\alpha h_{11} + \beta h_{21}, \alpha h_{12} + \beta h_{22}, \alpha h_{13} + \beta h_{23}, \alpha h_{14} + \beta h_{24} \quad (3)$$

In Eq. (3), coefficients $\alpha$ and $\beta$ can be chosen such that the received signal-to-noise ratio is maximized. Channel feedback according to either Eq. (2) or Eq. (3) is referred to as "reduced channel feedback". Channel feedback according in particular to Eq. (3) is referred to as "reduced channel feedback with linear combination". With reduced channel feedback, the network considers the number of antennas in the mobile user to be the same as the number of downlink channels that are fed back per antenna in a dominant beam.

It should be noted that reduced channel feedback decreases the feedback overhead of individual mobile users, not the aggregated feedback overhead. First note that if the number of mobile users remains the same in the CoMP set, reduced channel feedback decreases the CoMP capacity. This can be compensated by including more mobile users into the CoMP set such that reduced channel feedback does not decrease the CoMP capacity, which also means that reduced channel feedback does not decrease the aggregated feedback overhead.

It can be appreciated that for each downlink channel, TDP extraction-based feedback can be used that provides accurate channel feedback with very low feedback overhead. The very low feedback overhead per channel and the very small size of the CoMP set contribute to the very low the overall feedback overhead.

Figure 5:
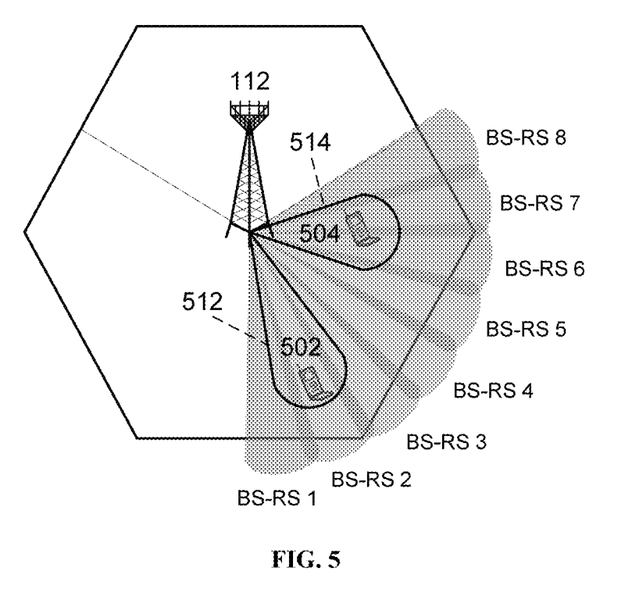
FIG. 5 illustrates examples of MIMO links on an RS-GOB.

According to some other aspects, a gridless MIMO (G-MIMO) link can be established between a multi-antenna mobile user and the base station. This is especially advantageous when the mobile user has a large number of antennas and its maximum throughput cannot be supported by a single beam. FIG. 5 illustrates examples of MIMO links on an RS-GOB. In FIG. 5, base station 112 transmits 8 BS-RS beams that collectively cover a cell sector. Mobile user 502 has 8 antennas. Base station 112 may choose to transmit an 8-antenna data signal over the entire cell sector for the G-MIMO link. Alternatively, base station 112 may choose to first obtain the location information of mobile user 502 and then transmit an 8-antenna data-signal beam (DS beam) 512 to mobile user 502.

The location information of a mobile user can be estimated from the beam profile information that the mobile user sends to the network. The dominant beams in the beam profile information provide an estimate of the mobile-user location. Alternatively, the network may also measure the angle of arrival (AoA) and/or time of arrival (ToA) of the mobile user signal to estimate the mobile-user location. Still another option is to use location services, such as GPS (global positioning system), to determine the mobile-user location.

According to some further aspects, more than one G-MIMO link can be established if the involved mobile users are spatially separated and if a base station has sufficient number of physical antennas. FIG. 5 illustrates an example of multiple G-MIMO links. In FIG. 5, mobile user 504 also has 8 antennas and is spatially separated from mobile user 502. If base station 112 has 16 or more physical antennas, it can transmit an 8-antenna DS beam 514 mobile user 504, simultaneous to beam 512.

Figure 6:
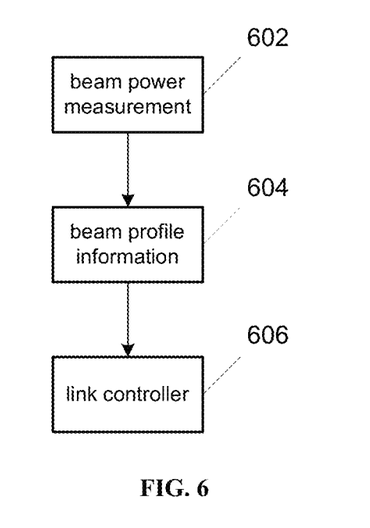
FIG. 6 illustrates an example diagram of link setup.

FIG. 6 illustrates an example diagram of link setup. Beam power measurement apparatus 602 measures the beam power via BS-RS. Beam profile information apparatus 604 generate beam profile information based on the output of beam power measurement apparatus 602. Link controller 606 uses beam profile information and other relevant information to set up the link between the base station and the mobile user.

Figure 7:
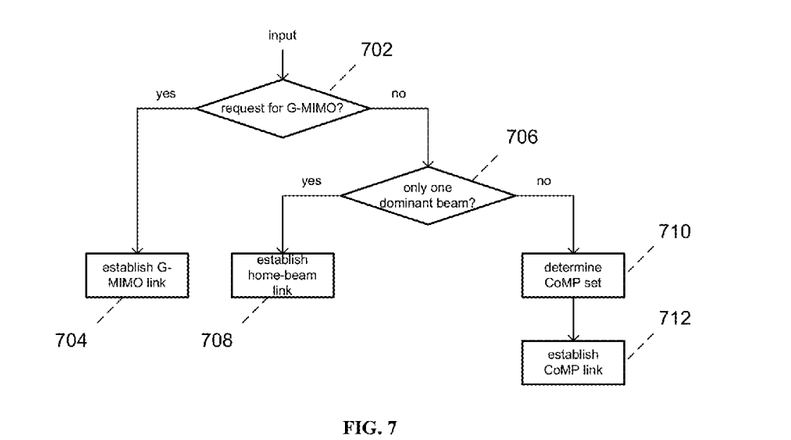
FIG. 7 illustrates an example flow chart of link setup control.

FIG. 7 illustrates an example flow chart of link setup control that link controller 606 in FIG. 6 may use. Step 702 takes the input information, including beam profile information, and checks whether there is a request for G-MIMO. If there is a request for G-MIMO, step 704 is taken to establish a G-MIMO link between the base station and the mobile user. If there is no request for G-MIMO, step 706 checks whether there is only one dominant beam. If there is only one dominant beam, step 708 is taken to establish a home-beam link between the base station and the mobile user, with the dominant beam being the home beam. If there is more than one dominant beam, step 710 is taken to determine the CoMP set. Step 712 establishes the CoMP link between the base station(s) and the mobile user(s) in the CoMP set.

Figure 8:
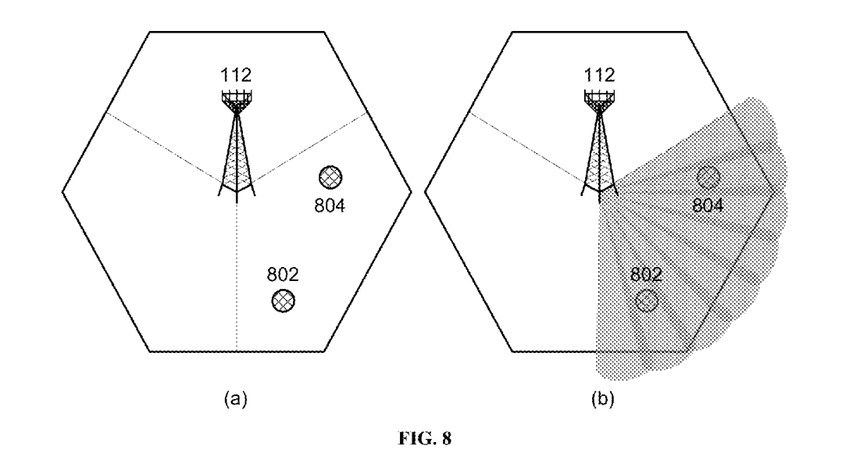
FIG. 8 illustrates two example small HetNet cells.

According to some other aspects, RS-GOB can be used to reduce the need for small HetNet cells. FIG. 8 illustrates two example small HetNet cells. In FIG. 8 (a), small HetNet cells 802 and 804 are placed in two "hot spots" of the cell sector serviced by base station 112. A hot spot is an area within a cell or a cell sector with a high concentration of mobile users. In FIG. 8 (b), base station 112 deploys RS-GOB with a beam pattern in which each hot spot falls within the center of a beam that can be used as the home beam for the mobile users in that hot spot. Small HetNet cells 802 and 804 are thus not necessary. Accordingly the need for HetNet backhaul and for decentralized control is also reduced.

Figure 9:
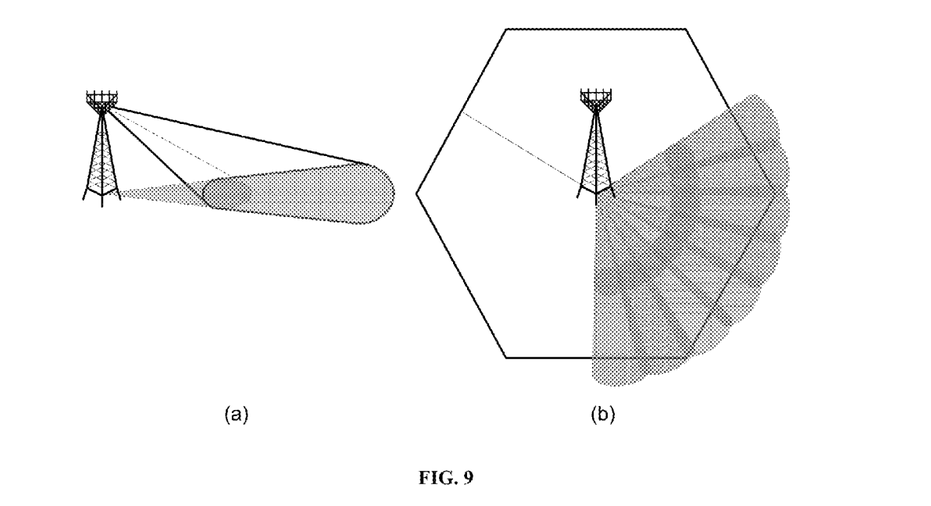
FIG. 9 illustrates an example beam pattern that has two beams in a given radial direction.

It should be noted that the RS-GOB patterns are not limited to the radial patterns in FIG. 5 and FIG. 8. If the physical antennas in a base station are arranged both horizontally and vertically, there can be more than one beam in a radial direction of the beam pattern. FIG. 9 illustrates an example beam pattern that has two beams in a given radial direction. FIG. 9(a) shows that a base station forms two beams in a given radial direction. FIG. 9(b) shows an RS-GOB pattern with two beams in any radial direction within a cell sector.

Figure 10:
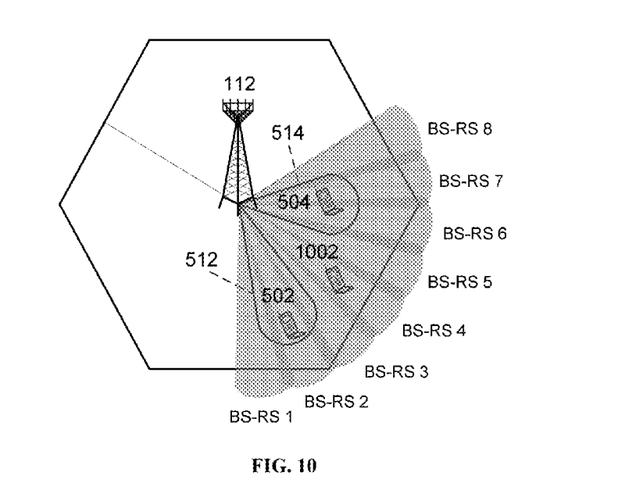
FIG. 10 illustrates an example of simultaneous G-MIMO and home-beam links.

It is to be understood and appreciated that the home-beam link, the CoMP link, and the G-MIMO link can co-exist in time if the links are spatially separated. FIG. 10 illustrates an example of simultaneous G-MIMO and home-beam links. In FIG. 10, beam 512 forms the G-MIMO link between base station 112 and mobile user 502. Mobile user 1002 using beam BS-RS4 as the home beam can be operational simultaneously with mobile user 502, since the home-beam link and G-MIMO link are spatially separated.

It is also to be understood and appreciated that the home-beam link, the CoMP link, and the G-MIMO link can co-exist in the same location if each link uses different resources. For example, in an LTE network, if each of the home-beam link, the CoMP link, and the G-MIMO link is assigned to a different group of subcarriers, then they can co-exist both in time and in the same location without interfering each other.

CONCLUSION, RAMIFICATIONS, AND SCOPE

Accordingly it can be seen that RS-GOB reduces the channel feedback overhead in CoMP, enables the maximum throughput for each mobile users with various number of antennas, and reduces the need for small HetNet cells, thereby achieving the full benefits of MU-MIMO.

It is to be understood and appreciated that the principles of the subject disclosure apply to LTE cellular networks, as well as to other wireless networks and systems, such as wireless local area network (WLAN). In a WLAN, an access point (AP) plays a similar role as a base station does in a wireless cellular network. Non-AP devices in a WLAN correspond to mobile users in a wireless cellular network.

While the foregoing disclosure describes illustrative aspects and/or embodiments, it should be noted that various changes and modifications could be made herein by those skilled in the art without departing from the scope of the described aspects and/or embodiments as defined by the appended claims. Furthermore, all or a portion of any aspect and/or embodiment can be utilized with all or a portion of any other aspect and/or embodiment, unless stated otherwise. It is, therefore, to be understood that the appended claims are intended to cover all such modifications, changes, and combinations as fall within the true spirit and the scope of the disclosed subject matter.

What is claimed is:

1. A method of wireless communications in a network, said network comprising at least one cell, said cell comprising at least one base station, comprising:
   (a) determining a beam pattern in said cell,
   (b) transmitting a plurality of signal beams according to said beam pattern, each of said signal beams comprising at least one beam-specific reference signal,
   (c) performing power measurement of said signal beams,
   (d) generating beam profile information, said beam profile information comprising information on at least one dominant beam from said power measurement of said signal beams,
   (e) establishing a gridless MIMO link between said base station of said cell and a multi-antenna mobile user with said beam profile information, if said multi-antenna mobile user requests said gridless MIMO link,
   (f) establishing a coordinated multipoint (CoMP) link in a CoMP set if there is more than one said dominant beam in said beam profile information, said CoMP set comprising a plurality of CoMP base stations and a plurality of CoMP mobile users, and
   (g) establishing a home-beam link between said base station of said cell and a mobile user, if there is only one said dominant beam in said beam profile information, said dominant beam being home beam of said home-beam link,
   whereby a combination of gridless MIMO links, CoMP links, and home-beam links in said network improves cell capacity.

2. The method of claim 1, wherein establishing said gridless MIMO link further comprises:
   (a) obtaining location information of said multi-antenna mobile user, and
   (b) transmitting a data-signal beam to said multi-antenna mobile user.

3. The method of claim 2, wherein said location information is derived from one of the following:
   (a) said beam profile information,
   (b) angle of arrival measurement,
   (c) time of arrival measurement, and
   (d) location services, such as Global Positioning System (GPS),
   or from any combination of the above.

4. The method of claim 2, wherein said data-signal beam is a multi-antenna data-signal beam.

5. The method of claim 1, wherein establishing said CoMP link further comprises determining said CoMP set based on said beam profile information and/or downlink channel information that is fed back from a plurality of candidate mobile users to said network.

6. The method of claim 5, wherein said home-beam link is established between said base station and a candidate mobile user if the number of antennas of said mobile user equals to or exceeds the number of antennas in said dominant beams from said power measurement of said signal beams by said candidate mobile user, whereby said candidate mobile user is not included in said CoMP set.

7. The method of claim 1, wherein establishing said CoMP further comprises performing downlink channel information feedback from candidate mobile users and/or CoMP mobile users.

8. The method of claim 7, wherein said downlink channel information feedback uses time-domain parameter extraction.

9. The method of claim 7, wherein said downlink channel information feedback uses reduced channel feedback.

10. The method of claim 9, wherein said reduced channel feedback is reduced channel feedback with linear combination.

11. The method of claim 1, wherein establishing said home-beam link further comprises transmitting a data signal and said beam-specific reference signal according to the same said beam pattern.

12. The method of claim 1, wherein a plurality of links, including said gridless MIMO links, said CoMP links, and said home-beam links, operate simultaneously if said plurality of links are spatially separated.

13. The method of claim 1, wherein a plurality of links, including said gridless MIMO links, said CoMP links, and said home-beam links, operate simultaneously if said plurality of links are assigned to different resources.

14. The method of claim 1, wherein determining said beam pattern further comprises placing a hot spot in the center of one of said signal beams, whereby a small HetNet cell is not needed in said hot spot.

* * * * *